US007804386B2

(12) United States Patent
Yonnet et al.

(10) Patent No.: US 7,804,386 B2
(45) Date of Patent: Sep. 28, 2010

(54) ELECTROMAGNETIC CONTROL DEVICE OPERATING BY SWITCHING

(75) Inventors: Jean-Paul Yonnet, Meylan (FR); Christophe Baldi, Paris (FR); Christophe Fageon, Montrouge (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 11/632,540

(22) PCT Filed: Jul. 4, 2005

(86) PCT No.: PCT/FR2005/050535

§ 371 (c)(1),
(2), (4) Date: Jan. 16, 2007

(87) PCT Pub. No.: WO2006/016081

PCT Pub. Date: Feb. 16, 2006

(65) Prior Publication Data

US 2007/0247264 A1 Oct. 25, 2007

(30) Foreign Application Priority Data

Jul. 16, 2004 (FR) .................................. 04 51561

(51) Int. Cl.

| | |
|---|---|
| ***H01F 7/08*** | (2006.01) |
| ***H01F 7/00*** | (2006.01) |
| ***F01L 9/04*** | (2006.01) |
| ***F16K 31/02*** | (2006.01) |

(52) U.S. Cl. .................... 335/229; 335/234; 123/90.11; 251/129.15

(58) Field of Classification Search ......... 335/220–240; 123/90.11, 90.25, 90.39
See application file for complete search history.

(56) References Cited

U.S. PATENT DOCUMENTS

| | | | | | |
|---|---|---|---|---|---|
| 2,913,639 | A | * | 11/1959 | Coppola | 361/209 |
| 2,930,946 | A | * | 3/1960 | Rommel | 335/230 |
| 3,573,811 | A | * | 4/1971 | Knecht | 340/815.63 |
| 3,708,723 | A | * | 1/1973 | Shand et al. | 361/90 |
| 3,928,988 | A | * | 12/1975 | Luth | 66/138 |
| 4,186,332 | A | * | 1/1980 | Montagu | 318/128 |
| 4,227,164 | A | * | 10/1980 | Kitahara | 335/230 |

(Continued)

FOREIGN PATENT DOCUMENTS

| | | | |
|---|---|---|---|
| FR | 2 849 100 | A | 6/2004 |

*Primary Examiner*—Elvin G Enad
*Assistant Examiner*—Alexander Talpalatskiy
(74) *Attorney, Agent, or Firm*—Nicholas E. Seckel

(57) ABSTRACT

The invention relates to an electromagnetic control device for the opening and closing of a mechanical element, particularly a valve of an internal combustion engine. The positioning of the mechanical element in at least one position (open or closed) is achieved by the action of at least one solenoid (90) acting on a plate controlling the position of the mechanical element. The device has at least two gaps which are closed by the plate on the positioning of the mechanical element in at least one position, the plate being mounted to rotate such that the axis of rotation of the plate is between the two gaps. The device also has at least one permanent magnet (99*b*) to polarize the device such as to hold the plate in at least one position in the absence of current through the solenoid (90), said permanent magnet (99*b*) not being crossed by the principal magnetic flux (92) of the solenoid (90).

20 Claims, 5 Drawing Sheets

U.S. PATENT DOCUMENTS

| | | | | | |
|---|---|---|---|---|---|
| 4,302,720 | A | * | 11/1981 | Brill | 324/146 |
| 4,329,672 | A | * | 5/1982 | Stahl et al. | 335/229 |
| 4,387,357 | A | * | 6/1983 | Mandel et al. | 335/272 |
| 5,117,213 | A | * | 5/1992 | Kreuter et al. | 335/219 |
| 5,253,619 | A | * | 10/1993 | Richeson et al. | 123/90.12 |
| 5,548,263 | A | * | 8/1996 | Bulgatz et al. | 335/274 |
| 6,031,437 | A | * | 2/2000 | Baurand et al. | 335/6 |
| 6,659,422 | B2 | * | 12/2003 | Padroni | 251/129.04 |
| 6,674,349 | B1 | * | 1/2004 | Bolongeat et al. | 335/229 |
| 6,819,207 | B2 | * | 11/2004 | Hertzog et al. | 335/132 |
| 2003/0184186 | A1 | | 10/2003 | Fukushima et al. | |
| 2004/0011309 | A1 | * | 1/2004 | von Gaisberg-Helfenberg | 123/90.11 |

* cited by examiner

ELECTROMAGNETIC CONTROL DEVICE OPERATING BY SWITCHING

The present invention relates to an electromagnetic control device for the opening and closing of a mechanical element, particularly a valve of an internal combustion engine. In such a device, which is also known as an actuator, the positioning of the mechanical element in at least one position (open or closed) is achieved by the action of a solenoid actuating a plate, containing a magnetic material, and controlling the position of the mechanical element.

Known devices of this type function such that the plate moves in translation or rotation around an axis of rotation located outside the zone of solenoid gaps, therefore comparable to a movement in translation of the plate.

The electromagnetic sizing of an actuator is conditioned by the force that it must exert. This force is linked to the stroke of the plate and to its mass. Indeed, the mass of the plate conditions its travel time and therefore imposes the stiffness of return springs which participate in actuating the plate. The force of the electromagnetic control device is coupled directly with the force of return springs since the actuator must be capable of exerting a force that is greater than that of springs to hold the plate in position.

It can be noted that the greater the stiffness of springs for obtaining a specified plate stroke and a specified travel time, the greater the size of the actuator.

The present invention results from the observation that the greater the mechanical performance of a given control device, the greater its size.

It relates to a device presenting at least a first and a second gap, of variable thickness, which are closed by the plate upon the positioning of the mechanical element in at least one position, the plate being mounted to rotate such that the axis of rotation of the plate passes between the first and second gaps.

In such a configuration, it can be noted that at a comparable exerted force, the inertia of the plate is lower than for a device operating in translation. Indeed, with devices in translation, the full plate moves for the full stroke. Instead, in a device where the plate is assembled in rotation around an axis located between the two gaps, the two ends of the plate move for the full stroke but the points of the plate located on the axis of rotation are motionless. The average movement is therefore half that observed in a device in translation.

This reduction in the inertia results in a reduction in the stiffness of springs and subsequently in the size of the device.

The second position of the mechanical element is such that the gaps are open or large gaps as they are called. A closed gap is also called small gap.

In an implementation of the invention, the device has a third and fourth gap of variable thickness which are closed by the plate upon the positioning of the mechanical element in the second position, the axis of rotation of the plate passing between the first, second, third and fourth gaps.

In this operation, the two valve positions are controlled by the plate which oscillates angularly between two positions controlled by similar means.

Advantageously, the second position of the mechanical element is obtained by the action of a second solenoid actuating the plate. This first embodiment, without permanent magnet, is called non-polarised actuator.

In another embodiment, the device has at least one permanent magnet for polarising the device in the absence of current in the solenoid and to linearize the system's operation.

In this embodiment called polarised, the mechanical element is held in place in an open or closed position by the permanent polarisation generated by the permanent magnet even in the absence of current circulating in the coil. In this case, the actuator is referred to as polarised.

In a polarised embodiment, the magnetic flux generated by the solenoid crosses the permanent magnet. This embodiment is called series polarisation.

Advantageously, the permanent magnet is thin.

In another polarised embodiment, the magnetic flux generated by the solenoid does not cross the permanent magnet directly. This embodiment is called parallel polarisation.

In another embodiment of the invention, the permanent magnet, although positioned outside the solenoid's magnetic circuit, is crossed by the magnetic flux generated by the solenoid such that said flux crosses two closed gaps.

Lastly, the magnetic material inside the plate is advantageously a ferromagnetic material.

According to another aspect, the invention relates to an electromagnetic control device for the opening and closing of a mechanical element, the positioning of the mechanical element in at least one position (open or closed) being obtained by the action of at least one solenoid actuating a plate containing a magnetic material and controlling the positioning of the mechanical element, this device having:

- at least a first and a second gap of variable thickness, which are closed by the plate upon the positioning of the mechanical element in at least one position, the plate being mounted to rotate such that the axis of rotation of the plate passes between the first and second gaps.
- at least one permanent magnet which polarises the device in order to hold the plate in at least one position in the absence of current in the solenoid, this permanent magnet not being crossed by the solenoid's main magnetic flux.

According to one embodiment of the invention, the magnetic flux generated by the solenoid crosses a gap without permanent magnet and positioned parallel to a gap containing a permanent magnet.

The fact that the magnetic flux does not cross the permanent magnet means that this magnet does need to be demagnetised, since it is not subjected to high demagnetising fields.

According to one embodiment, the magnetic flux generated by the solenoid crosses, in addition to the gap positioned parallel to the permanent magnet, both gaps closed by the plate when switching into a position.

The closed gaps, which the flux travels through, are seen by the coils as being relatively small, rendering the contribution from the coils more effective in terms of yield since the magnetic flux consequently meets with a smaller reluctance than if it was to cross large gaps such as those left open by the plate.

Other advantages and characteristics of the invention will become apparent with the description below, which is to be taken as a description and is non restrictive and refers to the drawings below in which:

FIG. 1 illustrates the operation of an electromagnetic control device according to the invention;

FIGS. 2*a* and 2*b* aim to illustrate the benefits of the invention with relation to a device operating in translation;

In the figures, the magnetic circuits and the magnetic flux are shown by a closed curve which, for the purpose of clarity, is referenced by one same reference.

Indeed, the magnetic circuit is a circuit that enables channelling of a magnetic flux. The arrow inscribed on such a closed curve specifies the direction of the magnetic polarisation flux. Magnetic fluxes are shown in the plate cross section diagram.

The symbols used are identical for all figures. Double arrows show the directions of polarisation flux in permanent magnets and the directions of induction fluxes created by these permanent magnets in gaps. The single arrows show the directions of the induction fluxes generated by the coils in the gaps.

The devices disclosed have preferably a linear behaviour and operate preferably without magnetic saturation in view of procuring a high level of controllability for the device. Said behaviour is enabled by correct sizing of the different components of the device.

Figure 1:
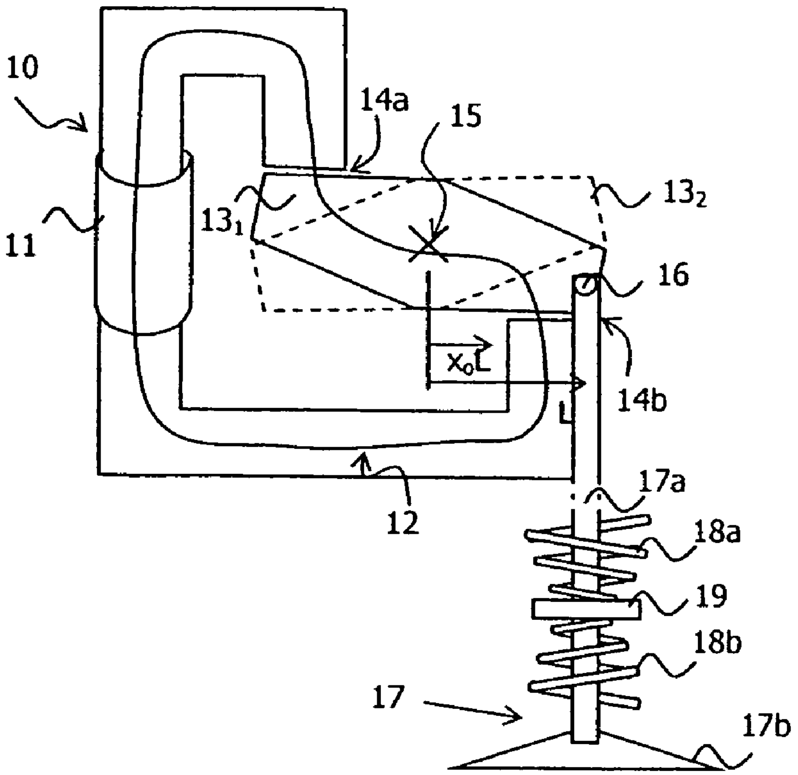

FIG. 1 shows the most simple embodiment of the invention in which a positioning of the mechanical element 17 in a position (open or closed) is obtained by the action of a solenoid 10 containing a first coil 11 and a first magnetic circuit 12. The solenoid 10 actuates a plate 13 containing a magnetic material, advantageously a ferromagnetic material. A permanent magnet may also be included in the plate. Positions 131 and 132 of this plate 13 control the positioning of the mechanical element 17. The device presents two gaps called first 14*a* and second 14*b* gaps. Said gaps 14*a* and 14*b* are closed by plate 13 upon the positioning of the mechanical element in open or closed position which corresponds to position 131 of plate 13 in the figure. Plate 13 is assembled in rotation to move from one position 131 to the other 132 such that the rotation axis 15 of plate 13 is between the first and second gap 14*a* and 14*b*.

In the configuration where the mechanical element 17 is a valve 17, as shown in FIG. 1, the connection of the plate 13 with the valve 17 is made using a hinge 16 between a valve rod 17*a* and the plate 13. The hinge 16 is positioned at one end of the plate 13. When the plate moves from one position to the other, the valve rod 17*a* has a linear back and forth movement and drives the head of valve 17*b*. Springs 18*a* and 18*b* and a fastening for springs 19 enable the return movement of the valve 17.

The positioning 131 is carried out when a current circulates in the first coil 11. The position is held by means of the circulation of said current or, as described below, using a polarisation created by means of a permanent magnet inserted into the magnetic circuit 12 of the solenoid 10 or in its vicinity. Positioning 132 can be realised by a means other than of electromagnetic type, for example, mechanical or by a different electromagnetic means or similar electromagnetic means to that shown in FIG. 1.

To highlight the advantages achieved by a device according to the invention, it should be noted first that the sizing of valve control devices is fully determined by two external parameters: the stroke and the half period (i.e. the time taken by the valve to move from one position to another).

The valve's stroke is defined by the operation of the heat engine. This stroke $2z_0$ (see FIGS. 2*a* and 2*b*) is imposed.

Given the stiffness k of springs and the stroke, the force exerted by these springs is obtained directly.

$$F = k\, z_0$$

The electromagnetic device must be capable of exerting a force that is greater than that of springs to hold the plate in one of the two positions. This electromagnetic force is directly proportional to the section S of gaps.

$$S = F/\alpha$$

The factor α is conventionally in the order of 100 N/cm$^2$, 160 at very maximum.

The mass of the plate is directly a function of this section of electromagnetic gaps since the section of the plate must be sized to pass through the magnetic flux.

$$m = \rho\beta s^{3/2}$$

in which ρ is the density of the plate's material, and β a format factor.

With respect to the stiffness k of springs, it is directly linked to the half period and mass of the plate.

$$K = m(2\pi/T)^2$$

This half period T/2 is linked to the operation of the heat engine. It is in the order of 3 ms.

The proportionality relations shown are merely a first approximation.

These relations show particularly that the sizing of the device, the mass of the plate and the stiffness of springs are directly linked to the stroke of the plate and to the half period.

Figure 2A:
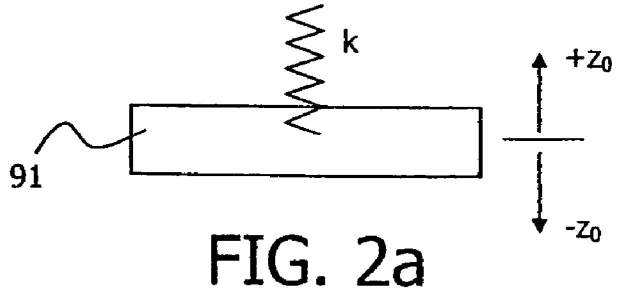
Figure 2B:
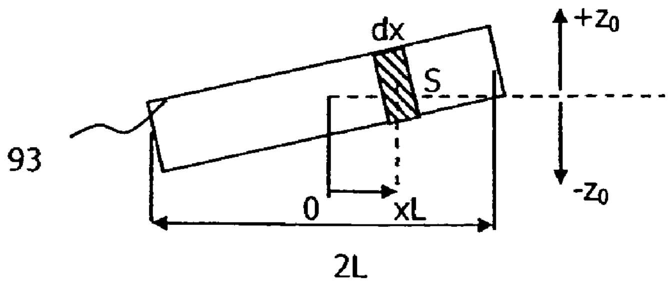

FIGS. 2*a* and 2*b* illustrate the advantage presented by a configuration in rotation according to the invention with relation to a configuration in translation such as those encountered in the prior art and confronted by the above-specified problems of inertia.

First the operation of the plate in translation will be studied. Its movement is the solution of the equation:

$$M\, d^2z/dt^2 + k\, z = 0$$

The solution, which corresponds to a free oscillation of the plate is of the type:

$$z = z_0 \cos \omega t$$

with $\omega^2 = k/m$

For the speed, we obtain:

$$dz/dt = z_0\omega \cos \omega t$$

At end of stroke, the energy stored by the compressed spring equals:

$$E_r = ½ k\, z_0^2$$

The kinetic energy is maximum at mid-stroke:

$$E_{ct} = ½ m\, v^2 = ½ m\omega^2 z_0^2$$

The equality of both energies enables verification that an oscillating system operates well by exchange between the potential energy stored in springs and the kinetic energy of the plate.

In the case of a device in rotation (or switching), to be able to make the comparison with the device in translation, it is assumed that the valve is pushed by the end of the plate, the movement of which will therefore be between $-z_0$ and $+z_0$.

To obtain the same travel time for the valve between the two positions, the tangential speed of the end of the plate must be the same as for the devices in translation. By assimilating the arc on the inside, which is justified for the small rotation angles, the following speed is obtained at the end of the plate:

$$dz/dt = z_0\omega \cos \omega t$$

The "switching-translation" comparison will be carried out with identical stroke and at identical maximum speed. We will compare the kinetic energies stored at mid-stroke.

If the plate has a uniform section S and a length 2 L (FIG. 9), if the position of the element dx is parameterised by its position x (x falls between −1 and +1), the speed of this element dx is given by:

$$V(x) = dz/dt(x) = z_0 \times \omega \cos \omega t$$

At mid stroke, the maximum kinetic energy of this element dx is given by:

$$dE_{cb} = 1/2(\rho \; S \; L \; dx)(z_0 \; x \; \omega)^2 = 1/2 \; \rho \; S \; L \; z_0^2 \; \omega^2 \; x^2 \; dx$$

By integrating $dE_c$ for x variant of −1 to +1, the value of the maximum kinetic energy is obtained:

$$E_{cb}=½(\rho S2L)z_0^2\omega^2(1/3)$$

The term (ρ S 2 L) represents the mass m of the plate, from where:

$$E_{cb}=½(m/3)z_0^2\omega^2$$

In comparison with the system in translation, the equivalent mass of the plate is divided by 3. The inertia is therefore divided by 3.

With the same plate, to obtain the same speed, the stiffness of springs must therefore be divided by 3.

And if the dependence is considered between the force of springs, the attraction surface of devices, the mass of the plate, the stiffness of springs, the introduction in loop of a factor 1/3 leads to a very notable decrease in the size of the device.

The factor 3 on the mass must nevertheless be reduced by a factor of the force of the device's effectiveness.

Indeed, on a control device in translation, the force of each gap is a fully usable axial force. This is not the case for a switching device. If comparing the forces, an equivalent couple must be applied to the force exerted at the end of the plate.

The device's force of attraction is exerted on the contact surface between plate 13 and the part of the magnetic circuit that comes into contact with the plate with small gap.

As shown in FIG. 1, the surface in contact varies from $x_0$ L to 30 L.

The equivalent force applied to the end is then multiplied by an efficiency factor $\gamma=½(1+x_0)$.

For a real system, the parameter $x_0$ should be in the vicinity of 0.3, corresponding to 0.65 for the factor γ.

The actual gain is only therefore 2/3 of the gain of 3 obtained on the equivalent mass of the plate. Overall, it results in a gain in the order of a factor 2.

In the worst case, when $x_0$ is very low, this factor stays above 0.5. The overall gain is therefore always greater than 1.5.

As shown in FIG. 1, in a switching device according to the invention, the valve is, for example, connected by a connecting-rod type system at the end of the plate. The return springs would then be positioned along the valve's axis.

In the embodiment examples described below, electromagnetic resources conform with the invention are used for positioning the valve in both positions. In this case, the plate operates between four gaps which operate in attraction two by two and alternately.

The embodiment examples are based on the different circulation possibilities for the polarisation flux in gaps, the different circulation possibilities for the excitation flux generated by the coils in gaps when the polarisation has been defined, the arrangement of coils in relation to the device and the layout of the device's permanent polarisation magnets.

Figure 3:
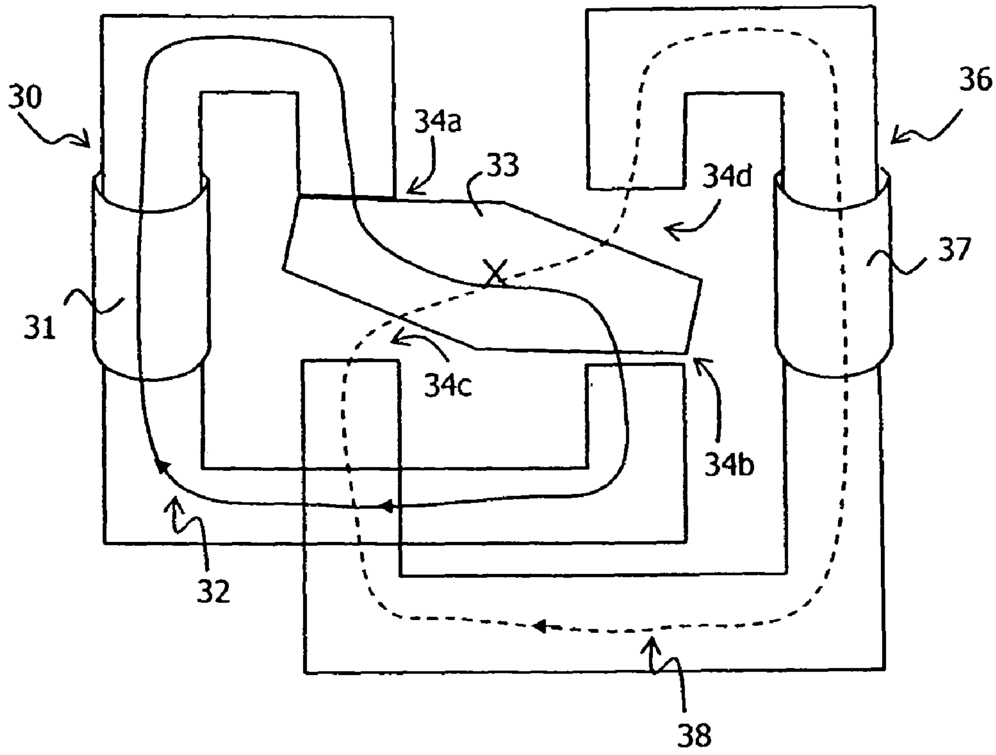
FIGS. 3 to 9 show seven embodiment examples for the invention.
Figure 4:
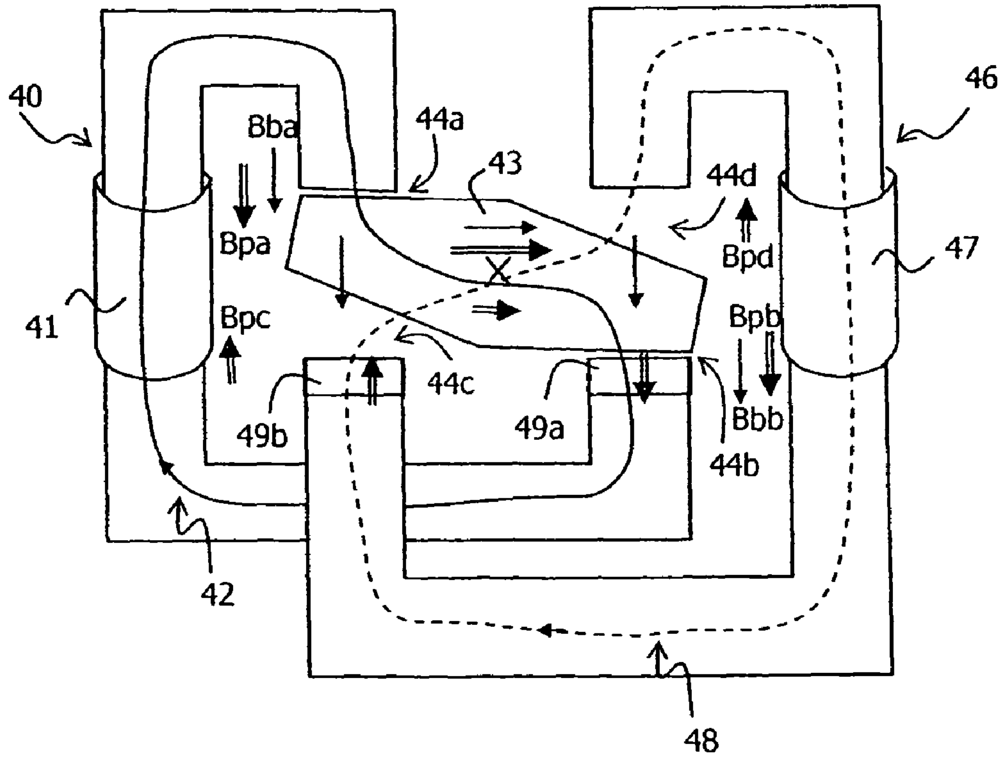
Figure 5:
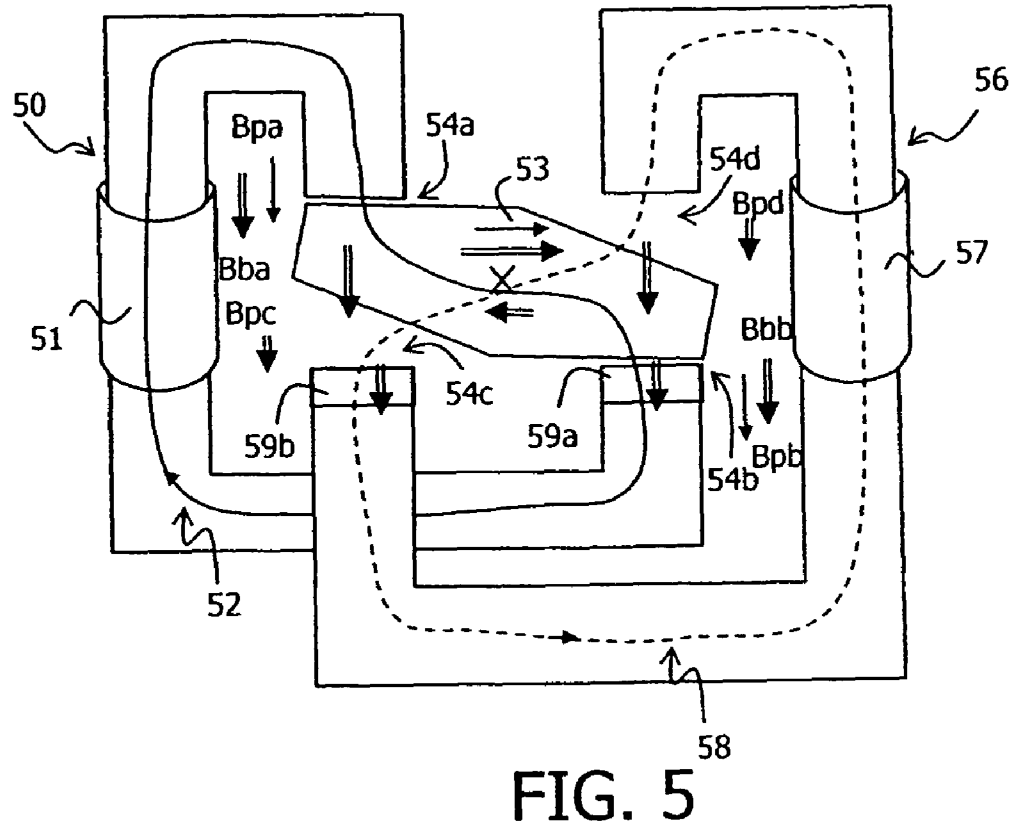

In FIGS. 3, 4 and 5, three devices are shown, operating on a principle that is close to that shown in FIG. 1.

FIG. 3 shows the case of a non-polarised device with four gaps in which both positions of plate 33 are controlled by two solenoids 30 and 36, having respectively a first and a second coil 31 and 37 and a first and second magnetic circuit 32 and 38. Four gaps 34*a*, 34*b* and 34*c*, 34*d* are therefore present in both magnetic circuits 32 and 38 and which are closed alternately, two at a time, according to the position of plate 33 and therefore the valve. This non polarised configuration is in fact a basic double system similar to the one described in FIG. 1.

In the example of FIG. 4, permanent magnets 49*a* and 49*b* have been added to a device as shown in FIG. 3. They enable polarisation of magnetic circuits 42 and 48 for solenoids 40 and 46 in the absence of current circulating in coils 41 and 47. Such polarisation holds plate 43 in position without reduced energy consumption. Indeed, due to the polarisation, the current circulation in the coils is not necessary while holding the plate in position.

The polarised control devices thus allow easy control of the intensity of currents, particularly with small gap (or closed gap) where the plate can be held in place without force.

The polarisation is referred to as series when the flux of a polarisation magnet is in series with the flux of the coil which actions the device. A series configuration is appropriate here. The configurations shown in FIG. 4 and FIG. 5 are examples of such a polarisation. These examples have the advantage of being configurations of simple construction even if the magnetic circuits holding the coils are relatively complex, since they are intertwined.

In the case of series configurations, it is advantageous that the magnets be as thin as possible to maintain a good efficiency of the coils' ampere turns. Indeed the magnets create an additional gap for the ampere turns generated by the coils. Furthermore, the magnets are subjected to demagnetising fields which can be high when the fields of coils are in opposition with their magnetisation.

The polarisation is referred to as parallel when the magnetic flux generated by the coil does not cross, or only crosses a small portion of, a polarisation magnet. The examples shown in FIGS. 6 to 9 are examples of such a polarisation. The configuration is then called parallel.

Figure 8:
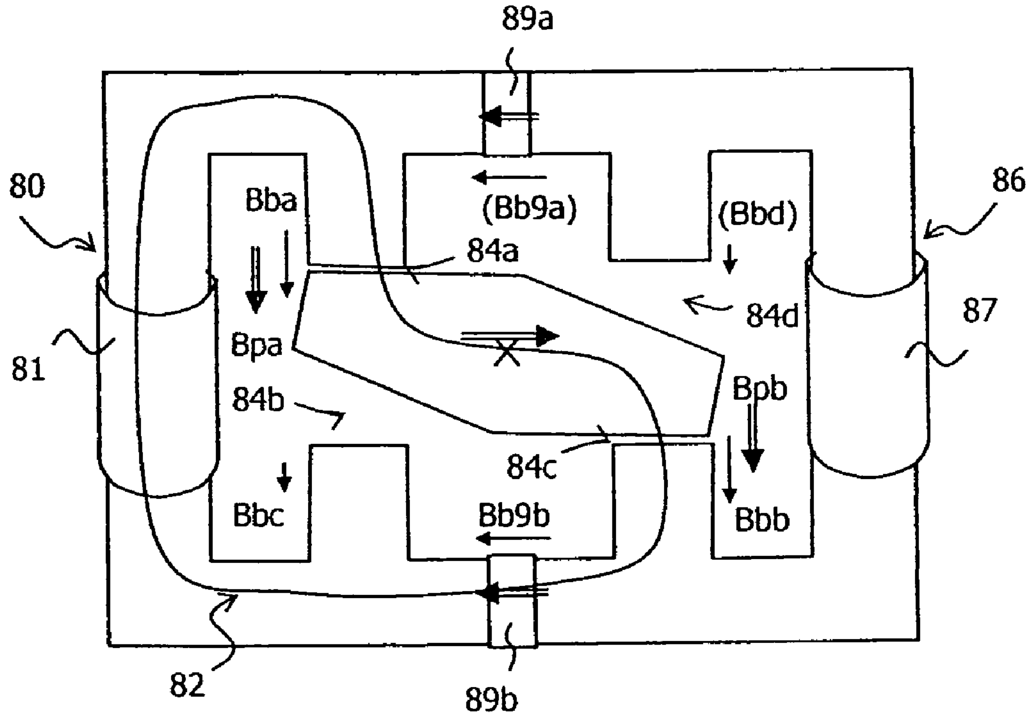
Figure 9:
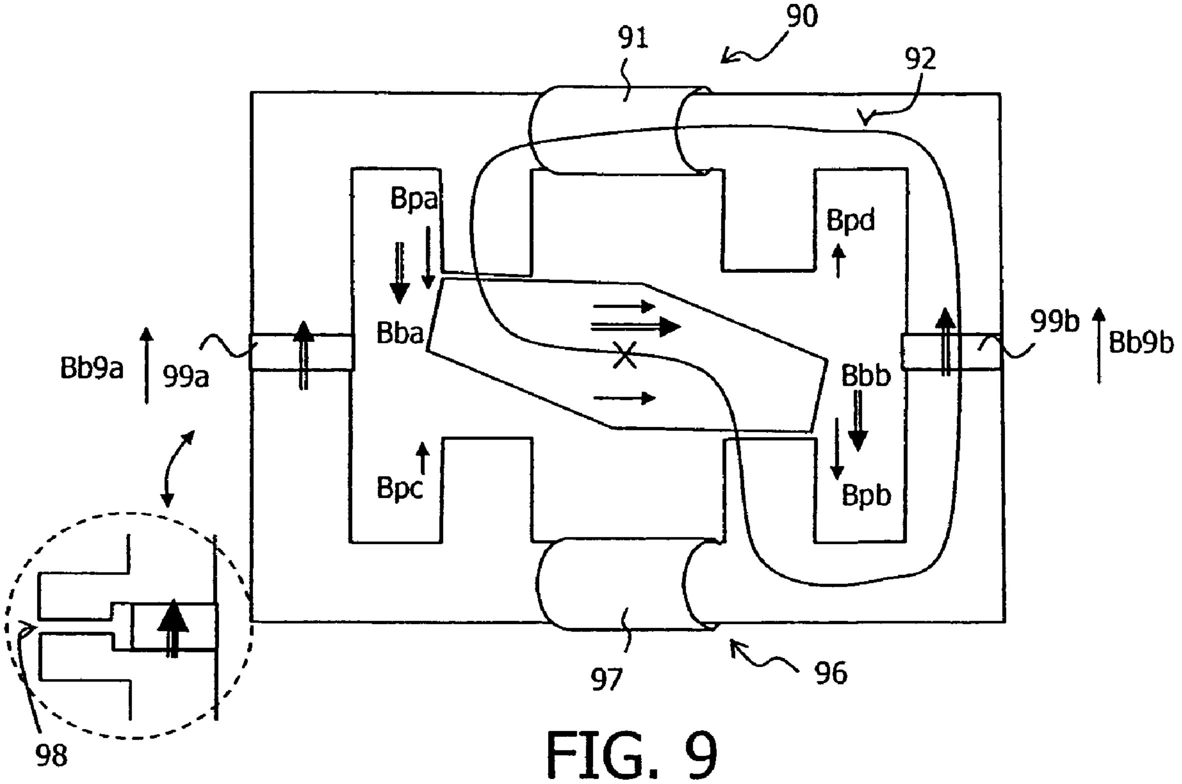

In FIGS. 8 and 9, an optimisation of the polarisation is obtained due to a configuration called parallel series.

In FIG. 4, the permanent magnets are such that the flux generated by their presence in magnetic circuits 42 and 48 turn in the same direction.

It is assumed, as shown in FIG. 4, that gaps 44*a* and 44*b* are virtually closed and that the position of the plate is such that gaps 44*c* and 44*d* are virtually equal to the stroke at the plate end, i.e. in the region of 8 mm.

The permanent magnet of polarisation 49*a* creates a magnetic flux 42 circulating in closed circuit. The inductions of polarisation Bpa and Bpb are therefore high in gaps 44*a* and 44*b*.

In gaps 44*c* and 44*d*, the induction Bpc and Bpd is lower since magnet 49*b* sees a relatively large gap, but it is not null. This induction generates a force that is quite low which reduces slightly the main force of attraction generated by magnet 49*a*. The use of magnets that are quite thin enables this force to be very low.

When coil 41 is supplied, inductions Bba and Bbb in gaps 44*a* and 44*b* are added (or deducted depending on the direction of the current) to the induction due to the polarisation. The magnetic flux generated by the current in coil 41 can in both directions be gyratory and follows the same circuit 42 as the magnetic polarisation flux. The coil 41 then sees a gap equivalent to the thickness of magnet 49*a*. The thickness of this magnet is therefore advantageously reduced to obtain a high effectiveness of actuation by the coil 41.

All the fluxes are added in the plate 43. Particularly, the flux generated by the magnet 49*a* is added to that generated by the magnet 49*b*. The flux generated by a current courant in the coil is added or subtracted from this sum of polarisation fluxes.

FIG. 5 shows a configuration similar to that shown in FIG. 4. These two configuration examples have different polarisation directions of the permanent magnets 59*a* and 59*b* in FIG. 5 which are anti-parallel. Thus the magnets are positioned in such a way that the polarisation flux generated by their presence in magnetic circuits 52 and 58 turn in opposite directions. The flux inversion of magnet 59*b* leads to the reversal of inductions in gaps 54*c* and 54*d*. This does not change the forces in gaps. On the other hand, in the plate, the two polarisation inductions are in reverse direction and the total polarisation flux is lower with relation to the configuration of FIG. 4.

In static position, the study of the operation of both configurations of FIGS. 4 and 5 shows that the forces generated are identical in both cases. The only difference appears at the level of the polarisation. Using a very basic model to calculate induction at uniform flux, it can be shown that the induction in gaps c and d is in the order of the tenth of the induction in the gaps a and b. Concerning forces, the contribution of gaps c and d is therefore in the order of the hundredth of the contribution of gaps a and b. Concerning the flux in the plate, the contribution of magnet b will be therefore in the order of the tenth of that of magnet a. With this polarisation, so that the flux of the coil can circulate without saturating, a plate can be used that is slightly thicker than for the configuration of FIG. 2*b* since the induction of the total polarisation is stronger in it.

In dynamic operation, the flux in the plate created by the polarisation always stays in the same direction in the configuration of FIG. 4, while it is reversed in the configuration of FIG. 5. This means that the currents induced in the plate are higher in the configuration of FIG. 5 than in the configuration of FIG. 4. For the rest of the magnetic circuit, the dynamic operation does not change.

Figure 6:
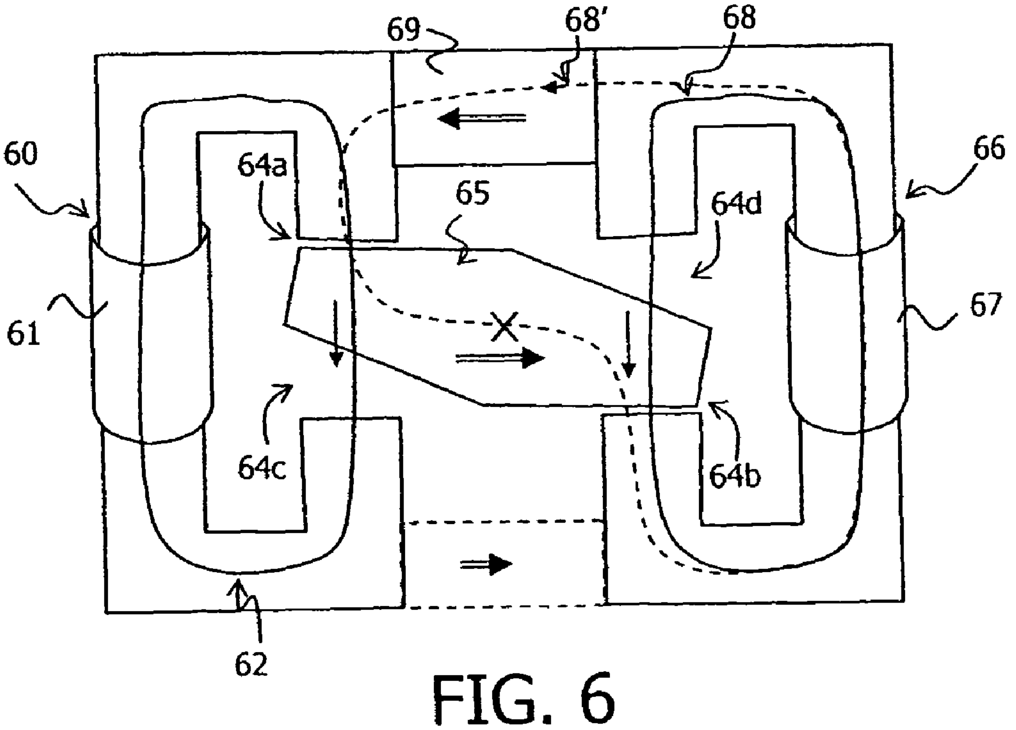

In FIG. 6, showing a case of parallel polarisation. The magnetic circuit 68 in which the magnetic flux circulates that is generated by the coil 67 of the solenoid 66 when a current travels through it does not contain a permanent polarisation magnet. The same applies for the magnetic circuit 62 in which the magnetic flux generated by a current in coil 61 circulates. A single magnet has been shown on the FIG. 6, but the system operates in the same way with a second magnet as for FIG. 8.

Figure 7:
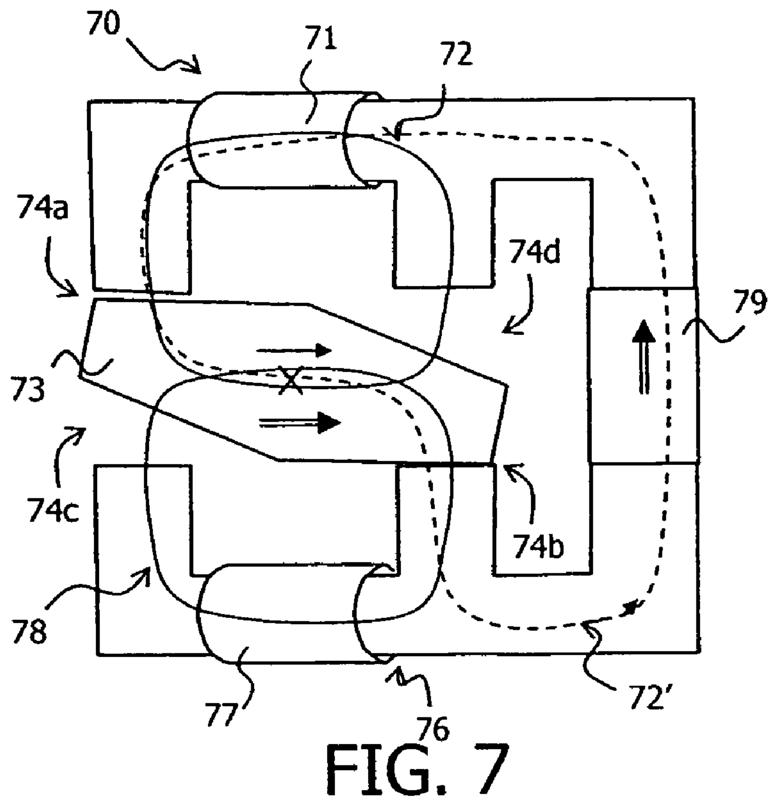

In FIG. 7, the magnetic circuit 72 in which the magnetic flux circulates that is generated by the coil 71 does not contain a permanent polarisation magnet. The same applies for the magnetic circuit 78 in which the magnetic flux generated by the coil 77 of the solenoid 76 circulates when a current travels through it. The polarisation magnet 79 generates a flux 72'. Only one magnet is shown in FIG. 7, but the system operates in the same manner with a second magnet (represented by dotted lines) as for FIG. 9.

In the parallel configurations shown in FIGS. 6 and 7, the gaps seen by the magnetic circuit of coils remain relatively wide, which means that the ampere turns lose in terms of efficiency.

Overall, the control device requires a very high efficiency with small gap. This efficiency is considered in terms of yield as well as in terms of capability of creating high forces.

The four examples shown in FIGS. 3 to 7 operate well with a small gap (also referred to as closed gap). The operating differences are apparent only at the level of complementary parameters such as the sections of the plate or the induced currents.

The parallel configurations with short magnets enable advantageously an operation of the parallel type with large gap (i.e. open gap) and of the series type with small gap (i.e. with closed gap). Such configurations, known as parallel series configurations, are described hereinafter. They are such that the permanent magnet, although positioned outside the shortest magnetic circuit for the solenoid, is crossed by a part of the magnetic flux generated by the solenoid in such a manner that said flux crosses two closed gaps.

FIG. 8 and FIG. 9 show respectively two improved configurations of configurations shown in FIGS. 6 and 7. The permanent magnets implemented are in fact of smaller size so as to enable the fluxes generated by the coils to cross them rather than to travel through a wide gap, c or d. FIGS. 8 and 9 are shown with two gaps, but a single magnet suffices to ensure their operation.

In FIG. 8, with relation to the configuration in FIG. 6, the circulation of the polarisation flux is unchanged. The plate closes the magnetic circuit of magnets back up completely. The difference concerns the circulation of the flux created by the coils. If we follow a flux line 82 generated by coil 81, it crosses the gap 84*a* creating the induced field Bba, then the plate 83, then the gap 84*b* creating the induced field Bba, then the magnet 89*b* creating the induced field Bb9*b*, then returns to the coil 81. The flux line therefore "avoids" in part the large gap c. In theory, this flux does not cross the magnet 89*a* because the reluctance provided by the plate 83 and the two closed gaps 84*a* and 84*b* is virtually nonexistent. Thus the flux generated by a current in coil 81 follows a magnetic circuit common to the polarisation flux of magnet 89*b*. With respect to the coil 87, its flux plays a symmetrical role by crossing the magnet 89*a*, then the gap 84*a*, the plate 83, then the gap 84*b*. The system can therefore operate with only one coil, 81 or 87, or with both coils supplied simultaneously.

If the plate is in median position, a stable position that is generally produced by springs, for which the four gaps are identical, the device can start-up alone.

Indeed, in this case that is not shown, the four inductions of polarisation Bpa, Bpb, Bpc and Bpd are identical, but the induction created by the coils 81 or 87 increases the fields in gaps 84*a* and 84*b* and reduces the fields in gaps 84*c* and 84*d*, activating the start-up of the device.

With respect to the configuration of FIG. 8, the configuration of FIG. 9 is such that the circulation of the polarisation flux is adjacent. For the circulation of coil fluxes, the situation does not change for the ampere turns of both coils which are added and which only see a gap of the same thickness as one single magnet. If we follow a flux line 82 generated by coil 91, this line crosses gap 94*a* creating induced field Bba, then plate 93, then gap 94*b* creating induced field Bbb, then magnet 99*b* creating induced field Bb9*b*, then returns to coil 91. The flux line therefore "avoids" in part the large gap d. In theory, this flux does not cross magnet 99*a* because the reluctance provided by plate 93 and the two closed gaps 94*a* and 94*b* is virtually nonexistent. Accordingly, it is possible to only use one coil at a time to control the device. As with the previous device, if the plate is in median position, a stable position that is generally produced by springs and in which the four gaps are identical, the device can start-up alone for the same reasons as above.

In both configurations shown in FIGS. 8 and 9, the flux of coils can cross a simple small gap 98 without magnet and crossed by ampere-turns parallel to the gap which contains the magnets as represented by a dotted circle in FIG. 9. This gap is only shown in FIG. 9, in parallel to magnet 99*a*, but analogous gaps can be used in parallel to magnets 89*a*, 89*b*, and 99*b*. It enables the use of relatively large sections for the permanent magnets. Moreover, these magnets cannot be subjected to significant demagnetising fields, which enables the use of low-quality magnets with large sections.

In static operation, in the plate for the configurations in FIGS. 8 and 9, the coils can operate separately, each coil controlling one of the two closed positions. In dynamic operation, the polarisation flux reverses in the configuration in FIG. 9 while it stays in the same direction in the configuration in FIG. 8. This can lead to higher induced currents in the configuration in FIG. 9. Given the direction of fluxes created by the coils, it is possible to only use one coil which encircles both magnetic circuits.

The magnetic circuit in configurations referred to as parallel series in FIGS. 8 and 9 is quite simple, and it enables a wide variety of realisations. For example, the magnetic flux can cross two gaps (84*a* and 84*c*) closed by the plate when switching into a position. This makes it possible to use relatively small gaps seen by the coils, and therefore to render the contribution of coils more effective than for the series polarisations.

It has therefore been shown that it is advantageous to use devices with small magnet thickness to obtain a series behaviour for small gaps and parallel behaviour for large gaps.

Nevertheless, care must be taken when using said thin magnets, which are relatively fragile, and which must be protected against shocks.

Figure 10:
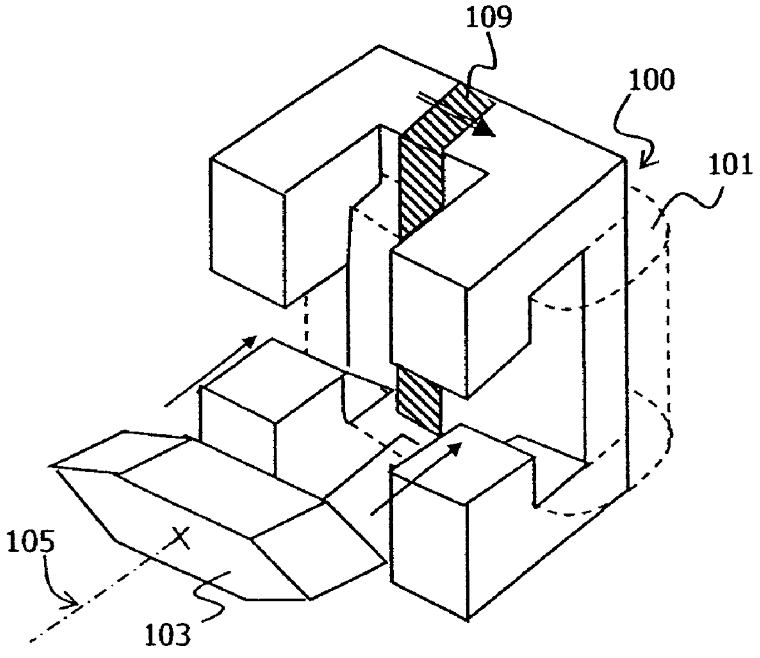
FIG. 10 shows a perspective view of an embodiment example for the invention.

All configurations shown "flat" in FIGS. 1 and 3 to 9 can be realised in 3 dimensions in a similar manner to those shown in perspective in FIG. 10. The configuration which is shown in greater precision "folded over" in FIG. 10 is similar to the configuration shown in FIG. 8. This configuration operates advantageously with a single magnet 109 of large section and relatively thin, and with a single solenoid 100 containing a coil 101, represented by dotted lines. A plate 103 is assembled in rotation around an axis 105 and is positioned between two branches of the solenoid to create the four gaps.

There are many possibilities for realising variants of the invention. Notably, there are various alternatives for the common or successive supply of coils, the geometric construction of the device, etc. Some embodiments have been described, others are mentioned succinctly hereafter.

In all figures, the plate is positioned in the middle of gaps for the purpose of simplicity in terms of variations of forces at each side of the plate. Nevertheless any other position of the plate such as the latter that is assembled in rotation around an axis located between the gaps of an axis positioned between the gaps is concerned by the invention.

With regards the configurations of parallel series type, the two coils can also be supplied simultaneously.

It can also be noted that the applications of the invention can be diverse. The invention and its embodiments shown may also be applied in control devices in which the forces are used to stabilise the moving part at the centre of the gap ("magnetic bearing"), and also in different activity sectors such as electromagnetic controlled circuit breakers.

The invention claimed is:

1. A motor vehicle engine valve assembly comprising a valve connected to an electromagnetic control device for the opening and closing of the valve, wherein the control device comprises:

an actuation plate containing a magnetic material and controlling the position of the valve between an open position of the valve and a closed position of the valve, at least one coil actuating the plate, the positioning of the valve in at least one of the open and closed positions being obtained by the action of the at least one coil a first and a second gap of variable thickness, wherein the thickness of each of said first and second gaps varies between a maximum thickness in a maximal opening position of said plate and a zero thickness in a closing position of said plate, and wherein said first and second gaps are closed by the plate upon the positioning of the valve in the closed position, a third and a fourth gap of variable thickness, wherein the thickness of each of said third and fourth gaps varies between a maximum thickness in the closing position of said plate and a zero thickness in the maximal opening position of said plate, and wherein said third and fourth gaps are closed by the plate upon the positioning of the valve in the open position, the plate being mounted to rotate such that the axis of rotation of the plate passes between the first, second, third and fourth gaps, wherein a main magnetic flux generated by the coil passes through the plate by being channeled across at least one of the first and second gaps of variable thickness during the whole rotation travel of the plate from the maximal opening position of the plate to the closing position of the plate, and a single permanent magnet which polarises the device so as to hold the plate in each of the maximal opening position of said plate and the closing position of said plate in the absence of current in the coil, wherein a magnetic circuit of the magnetic flux generated by the coil does not contain the permanent magnet.

2. A device according to claim 1 in which the other of the open and closed positions of the valve is obtained by the action of a second coil actuating the plate.

3. A device according to claim 1 in which the magnetic flux generated by the coil crosses a gap without permanent magnet and positioned parallel to a gap containing the permanent magnet.

4. A device according to claim 3 in which the magnetic flux generated by the coil crosses, as well as the gap located in parallel to the permanent magnet, the two gaps closed by the plate when switching into a position.

5. A device according to claim 1 in which the magnetic material inside the plate is a ferromagnetic material.

6. A device according to claim 1 in which the coil is made up of a winding and a magnetic circuit with a magnetic core around which the winding is wound and four arms, with their four ends each forming a side of a gap, the other side of the gap being on the plate.

7. A device according to claim 1, wherein the plate is connected to the valve by a hinge provided between the plate and a rod of the valve, so that, when the plate moves from one position to another, the valve rod has a linear back and forth movement and drives a head of the valve.

8. A device according to claim 7, wherein springs are provided that enable a return movement of the valve.

9. A device according to claim 1, wherein at least one of the permanent magnet and the coil is outside of the rotation plane of the plate so that the magnetic circuit has a three-dimensional configuration.

10. A device according to claim 9, wherein the permanent magnet and the coil are outside of the rotation plane of the plate.

11. Device according to claim 9, wherein the coil is outside of the rotation plane of the plate.

12. Device according to claim 11, wherein the coil is a single coil which actuates the plate to reach both the maximum opening position and the closing position of the plate.

13. Device according to claim 10, the coil is a single coil which actuates the plate to reach both the maximum opening position and the closing position of the plate.

14. Device according to claim 1, wherein the coil is a single coil which actuates the plate to reach both the maximum opening position and the closing position of the plate.

15. Device according to claim 6, wherein the coil is outside of the rotation plane of the plate.

16. Device according to claim 15, wherein the coil is a single coil which actuates the plate to reach both the maximum opening position and the closing position of the plate.

17. Device according to claim 9, wherein the single permanent magnet is outside of the rotation plane of the plate.

18. Device according to claim 12, wherein the single permanent magnet is outside of the rotation plane of the plate.

19. Device according to claim 13, wherein the single permanent magnet is outside of the rotation plane of the plate.

20. Device according to claim 14, wherein the single permanent magnet is outside of the rotation plane of the plate.

* * * * *